US006502209B1

(12) United States Patent
Bengtsson et al.

(10) Patent No.: US 6,502,209 B1
(45) Date of Patent: Dec. 31, 2002

(54) CHIP WITH DEBUG CAPABILITY (75) Inventors: Jan Bengtsson, Lund (SE); Kenny Ranerup, Lund (SE); Per Zander, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/241,204

(22) Filed: Feb. 1, 1999

(30) Foreign Application Priority Data

May 13, 1998 (SE) ............................................. 9801678

(51) Int. Cl.[7] ........................ H02H 3/05; H03K 19/003; H04B 1/74
(52) U.S. Cl. ............................. 714/35; 714/10; 714/11; 714/12
(58) Field of Search .............................. 714/10, 11, 12, 714/35

(56) References Cited

U.S. PATENT DOCUMENTS

| | | | |
|---|---|---|---|
| 5,132,971 A | | 7/1992 | Oguma et al. .............. 371/16.2 |
| 5,434,997 A | | 7/1995 | Landry et al. ............... 395/575 |
| 5,488,688 A | | 1/1996 | Gonzales et al. ......... 395/183.1 |
| 5,491,787 A | * | 2/1996 | Hashemi ...................... 714/11 |
| 5,491,793 A | | 2/1996 | Somasundaram et al. ...................... 395/183.21 |
| 5,809,037 A | * | 9/1998 | Mathewson ................. 371/22.1 |
| 6,131,171 A | * | 10/2000 | Whetsel ........................ 714/35 |

FOREIGN PATENT DOCUMENTS

| | | | | |
|---|---|---|---|---|
| EP | 0313848 | 5/1989 | ........... | G06F/11/00 |
| WO | WO 94/08313 | 4/1994 | ........... | G06F/15/80 |

* cited by examiner

*Primary Examiner*—Peter Wong
*Assistant Examiner*—Tim Vo
(74) *Attorney, Agent, or Firm*—IP Creators; Charles C. Cary (57) ABSTRACT

The present invention relates to a computer chip having integrated thereon a CPU, and a cache system being interconnected, and at least one synchronization unit. The chip is setable in one of at least two different running modes, a first one thereof being a DUT mode, and a second one thereof being a MONITOR mode. The MONITOR mode is complementary to the DUT mode. The chip additionally comprises a debug bus connectable to another identical chip for communicating signals enabling the chip and said another chip to run in parallel while said chips being in complementary modes. Said signals comprises synchronization signals generated by said synchronization unit. The present invention further relates to a computer apparatus, and a debugging system both employing at least one such chip.

10 Claims, 7 Drawing Sheets

MONITOR

DUT

CHIP WITH DEBUG CAPABILITY

PRIORITY CLAIMED

This application claims the benefit of priority to Swedish Application No. 9801678-5 filed May 13, 1998, entitled Computer Chip And Apparatus With Enhanced Debug Capability.

BACKGROUND OF THE INVENTION

1. Technical Field

The present invention generally relates to a computer chip and a computer apparatus, and more specifically to a computer chip and apparatus fully adapted to program debugging. It also relates to debugging system.

2. Technical Background

In developing new computer programs an important step is to debug the program in order to correct programming errors. Program debugging is performed by executing the program on a computer and monitoring different signals being communicated externally between the computer and peripherals as well as internally between different circuits of the computer. Such circuits are, for example, Central Processing Unit (CPU), Direct Memory Access (DMA) unit, main memory, and input/output (I/O) interface circuit. To be able to debug the program while the computer is running, conventionally for example a logic analyzer is connected by means of probes to the circuit board on which the computer circuits are mounted.

In order to speed up memory accesses, typically, a computer is provided with a cache memory. This memory is used, mainly by the CPU, as a fast, i.e. which has short access times, temporary memory, which holds only the most frequently and most recently used main memory addresses and data. A major part of all CPU main memory accesses are handled by merely the cache memory, and only a minor part incorporates the main memory by means of data exchange between the main memory and the cache memory. Thus, the communication between the CPU and the cache memory is central in the program execution and, therefore, is desirable to debug.

However, in modem computer construction there is an aim to integrate as many of the computer circuits as possible on a single chip. Typically, among others, both the CPU and the cache memory are integrated on the same chip, while the main memory is external to the chip though normally mounted on the same circuit board. The main memory normally is constructed from several interconnected chips. Due to the one chip integration it is not possible to monitor the communication between the CPU and the cache memory while debugging, but only between the CPU and the main memory.

Some different solutions to this problem have been tried. One prior art solution is to turn off the cache memory during the debugging operation. Thereby all memory accesses are made to the main memory and are able to be monitored. However, this means that one looses the possibility to monitor the program in true circumstances, and above all the execution rate is decreased. There are several types of erroneous behaviors that will not show under such circumstances. The cache handling is a crucial part of the operation of the program.

Another prior art solution is to manufacture a so called bondout chip, which is a special version of an ordinary chip, the special version chip having extra pins connected to internal buses of the chip. This is an expensive solution, since it requires manufacturing of a special chip parallel to the ordinary chip. Further, it causes the clock frequency to be decreased due to, among others, the extended leads. Thereby, a real-time debugging is not performed, which makes it possible for certain bugs causing errors in real-time execution to remain undetected.

Yet another prior art solution is to arrange certain registers providing for debug support. These registers, often referred to as breakpoint registers, permit the use of software breakpoints at predetermined points of the program execution. At the breakpoints current address and data information is loaded into the breakpoint registers to be read out by the monitoring system. This solution makes it possible to detect that the program execution has arrived safely at the breakpoints. However, a major drawback is that the debugging is not effected in real-time. Additionally, what happens between the breakpoints is not monitored.

Therefore there is a need for a new computer apparatus providing for monitoring also the communication between the CPU and the cache memory, the CPU and the cache memory being integrated on the same chip, while the computer is running at full clock rate.

An object of the present invention is to provide for monitoring the program execution to a greater extent than is possible in the prior art, while running the CPU at full clock rate, i.e. performing real-time debugging, and without providing a special version chip for debugging purposes.

SUMMARY OF THE INVENTION

In accordance with the invention, the object is achieved by a computer chip having integrated thereon a CPU and a cache system being interconnected, and at least one synchronization unit, said chip being setable in either one of at least two different running modes, a first one thereof being a device under test (DUT) mode, and a second one thereof being a MONITOR mode. The monitor mode is complementary to the DUT mode. The chip further comprises a debug bus connectable to another identical chip for communicating signals enabling the chip and said another chip to run in parallel while said chips are set in complementary modes. The signals comprise synchronization signals generated by said synchronization unit.

The computer chip, in this way being prepared for a debugging operation eliminates the excessive costs of producing a special version chip for debugging purposes. The debug bus and the synchronization circuit in combination provides for an efficient exchange of a small set of essential signals to another identical chip, which is set in MONITOR mode, i.e. debugging mode. The different modes are prepared for. Thus, a full rate debugging obtaining full information about the program execution is reachable.

DETAILED DESCRIPTION

Figure 1:
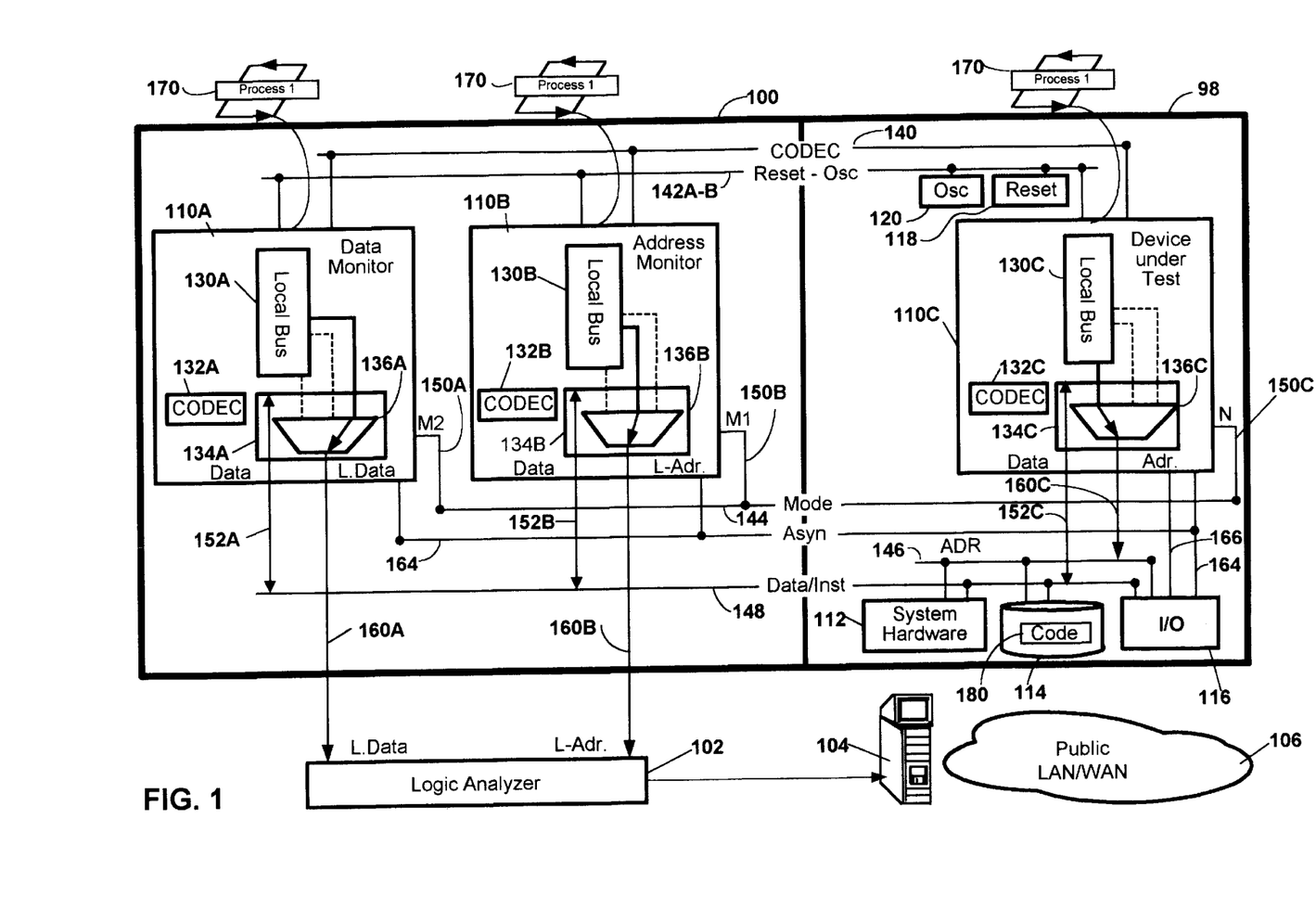
FIG. 1 is a hardware block diagram of a test configuration utilizing a chip with debug capability.

FIG. 1 is a hardware block diagram of a test configuration of a chip with enhanced debug capability. The chip, in one embodiment of the invention, has all the essential functions of a "computer on a chip" including a central processor, a cache, a DMA unit, a local bus, and a memory manager. In addition the chip contains circuitry which allows it to function in either a master (a.k.a. device under test) ("DUT") mode or any of several slave (a.k.a. MONITOR) modes. The inner workings and program code execution of the chip assuming DUT mode are exposed using one or more of the same chips enabled for MONITOR mode. In the MONITOR mode internal states of the DUT mode chip are exposed thereby simplifying the task of debugging the DUT mode chip and/or program code running on the DUT mode chip.

Several identical chips are coupled on a common set of busses. One is configured to assume master mode while identical chips serve in MONITOR mode. Debugging is accomplished by causing the chip assuming master, i.e. "Device Under Test" ("DUT") Mode to control the address portion of the system bus. As the address bus master, the chip in DUT mode controls the addresses present on the address bus and thus the memory and device access requests for the system including all master and slave mode chips. All chips, both slaves and master, are connected to the data portion of the system bus. All chips therefore receive and process the same data and program code over the data portion of the system bus. All chips additionally contain synchronization circuitry to assure synchronous processing of program code and data.

The address lines of the chips in slave/monitor mode are not needed to output address information to the address bus, since the chip in master mode assumes this function. The address line outputs of each of the chips in MONITOR mode are instead utilized to carry information from inside the chip to the "outside world" by switchably connecting the address lines/pins of the chips in the MONITOR mode to various components or signal lines internal to the chip for which there are no external pin connections. Those components or signal lines include: the cache, the local bus data and address lines, the interrupt unit and the DMA unit. Normally such information would not be available thus making it difficult to debug the chip and or program code running on it.

FIG. 1 shows a test configuration with a computer system 98, a monitor 100, a logic analyzer 102, a computer 104 and a network 106. The computer system 98 includes a chip 110C in DUT mode serving as the core of the computational system. The computational system 98 also includes an oscillator 120, a power on reset 118, associated system hardware 112, memory 114 and an input and output unit (I/O) unit 116. The chip with enhanced debug capability 110C, configured in this case in DUT mode, includes a local bus 130C, a Codec unit 132C and a memory control unit 134C. The memory control unit includes a first local bus debug switch 136C. The monitor 100 includes two chips with enhanced debug capability 110A–B configured in MONITOR mode. All chips 110A–C have similar components which are referenced respectively with reference number suffixes A–C.

In the embodiment shown common busses connect the computer system 98 to the monitor 100. Those busses are a Codec bus/debug bus/encoded event bus 140, a reset and oscillator bus 142A–B, an asynchronous event bus 164, a mode select bus 144 and a data/instruction portion 148 of the system bus 146–148. The DUT mode debug chip 110C is coupled via data line 152C and address line 160C to respectively, the data 148 and address 146 portions of the system bus 146–148. The MONITOR mode chips 11A–B are also coupled via respectively data lines 152A–B to the data portion of the system bus. The system bus 146–148 is also coupled to the system hardware 112, the memory 114 and the I/O unit 116. The DUT mode debug chip 110C and the MONITOR mode chips 110A–B are also coupled to the power on reset 118 and the oscillator 120 via bus 142A–B. The MONITOR and DUT mode chips 110A–C are also coupled via respectively mode select mode input pin 150A–C to a mode select bus 144 for establishing the operational mode of each chip. The DUT and MONITOR mode chips are also coupled to an asynchronous event bus 164. Finally, a debug bus 140is coupled to all chips 110A–C for synchronizing their activity including: power-on-reset, interrupts, wait states, DMA accesses and other asynchronous events.

In contrast to the address line 160C of the DUT mode debug chip 110C, the corresponding address lines 160A–B of respectively, debug chips 110A–B are instead coupled to the logic analyzer 102. It is over these lines 160A–B that signals corresponding to local bus activity and/or interrupt or DMA activity of chip in DUT mode debug chip 110C are provided to the logic analyzer 102 for display and analysis on the computer 104.

In operation each of the enhanced debug chips 110A–C executes identical processes 170 derived from program code 180 stored in memory 114. In an embodiment of the invention, all chips 110A–C boot to the same address in main memory. However, only the debug chip 110C configured in DUT mode has its address line coupled to the address portion 146 of the system bus 146–148. It is therefore this chip 110C which acts as the master of the address portion of the system bus. As the bus master chip 110C determines what access requests will be handled on the address bus and therefore what data and or program code will be present on the data portion 148 of the system bus. A typical program sequence provided over the data portion of the system bus to each of the chips 110A–C might include a read or write instruction to a specific address followed by data being read from or written to that specific address by each of the above-mentioned chips. Each of the MONITOR mode chips 110A–B therefore shadows the activity of the master chip 110C receiving identical data and instructions and performing the same operations 170C in response, for example, to the program code 180 stored in main memory. None of the monitor chips write to external memory 114. The external memory is always written to only by the DUT mode debug chip 110C.

In order to debug a chip itself and or the program code that the chip is running, it is advantageous to have access to and to monitor the states of various components and signal lines internal to the chip for which there are no pin connections. Typically, a large portion of the computational activity of this computer chip and other chips such as logic units, digital signal processors, graphics processors, etc. is not available on external pins. In the embodiment shown, i.e. the "computer" chips 110A–C with enhanced debug capability such activity takes place "upstream" of the memory control units 136A–C on what is known as the local bus 130A–C. In the embodiment shown the local bus couples synchronous components such as cache memory and asynchronous components such as DMA and interrupt units. Much of the processing on each of the chips can take place on the local bus between that CPU and cache memory, or a DMA unit and that activity will not be exhibited on the system bus.

Typically execution of program code involves instructions received by each of the chips 110A–C from the data portion 148 of the system bus. Program code will cause the central processing unit "CPU" of each chip to perform logical and arithmetic operations and may additionally require that data be read from or written to memory 114 over the data portion of the system bus, in order to perform those operations. Since each of the chips is running under the same program code and the same sequence, only one chip needs to "master" the bus and in the embodiment shown that chip is chip 110C configured in the DUT mode. The read and write requests of that chip are placed on the address portion 146 of the system bus 146–148, and thereby determine the contents of the data portion 148 of that bus.

Each chip 110A–C is configured in DUT mode or any of several MONITOR modes by signals placed on mode input pins respectively 150A–C. A device might be placed in DUT mode by a digital signal corresponding to the binary sequence "000" placed on its port. A device might be placed in any of the several MONITOR modes by signals corresponding to the binary sequences "001-111". Numerous internal state changes are effected in response to each distinct mode signals. One of these is the connection of the debug switch 136A–C of each of the chips. Chip 110C is in DUT mode and as such its debug switch 136C couples the address output 160C to the address portion of the local bus 130C via a memory interface unit 310C (see FIG. 3) within the memory control unit 134C. In this mode addresses present on the address portion of the local bus will only appear on address output 160C when appropriate in view of the cache policy and the state of the on chip cache memory 244C (see FIG. 2) of the chip. Conversely, the one or more debug chips configured in the monitoring mode, e.g., debug chips 110A–B have their associated debug switches 136A–B connected to the address portion of the local bus and the data portion of the local bus without any "filtering" by the memory control. The activity of these lines is provided to the logic analyzer 102 by the address output lines 160A–B of these chips. In each of these MONITOR mode chips 110A–B the local bus address line continues to exhibit read and write commands with associated addresses. A distinction then between these chips in MONITOR mode and the chip 110C in DUT mode is that in the MONITOR mode chips the addresses present on the local address line(s) do not reach the address portion 146 of the system bus and thus do not, except by inference, control the data available on the data portion 148 of the system bus. Instead, the data on the data bus is actually determined by the addresses provided by the chip 110C configured in the master or DUT mode. Thus, by allowing one chip to be configured to master the address portion of the system bus (and therefore to determine the contents of the data portion 148 of the system bus), the activities of the MONITOR mode chips can be made to shadow that of the DUT mode chip. In the following drawings and text, additional mode dependent capabilities of the chip will be set forth. Those include: externalizing the interrupt and DMA access states and synchronizing the processing of several chips will be disclosed.

As will be obvious to those skilled in the art, mode selection can be accomplished without a dedicated mode select pin(s) on the chip. In an alternate embodiment of the invention configuration of the debug components of the chip can be achieved through data sequences received by the chip at startup or by multiplexing existing pins on the chip.

Figure 2:
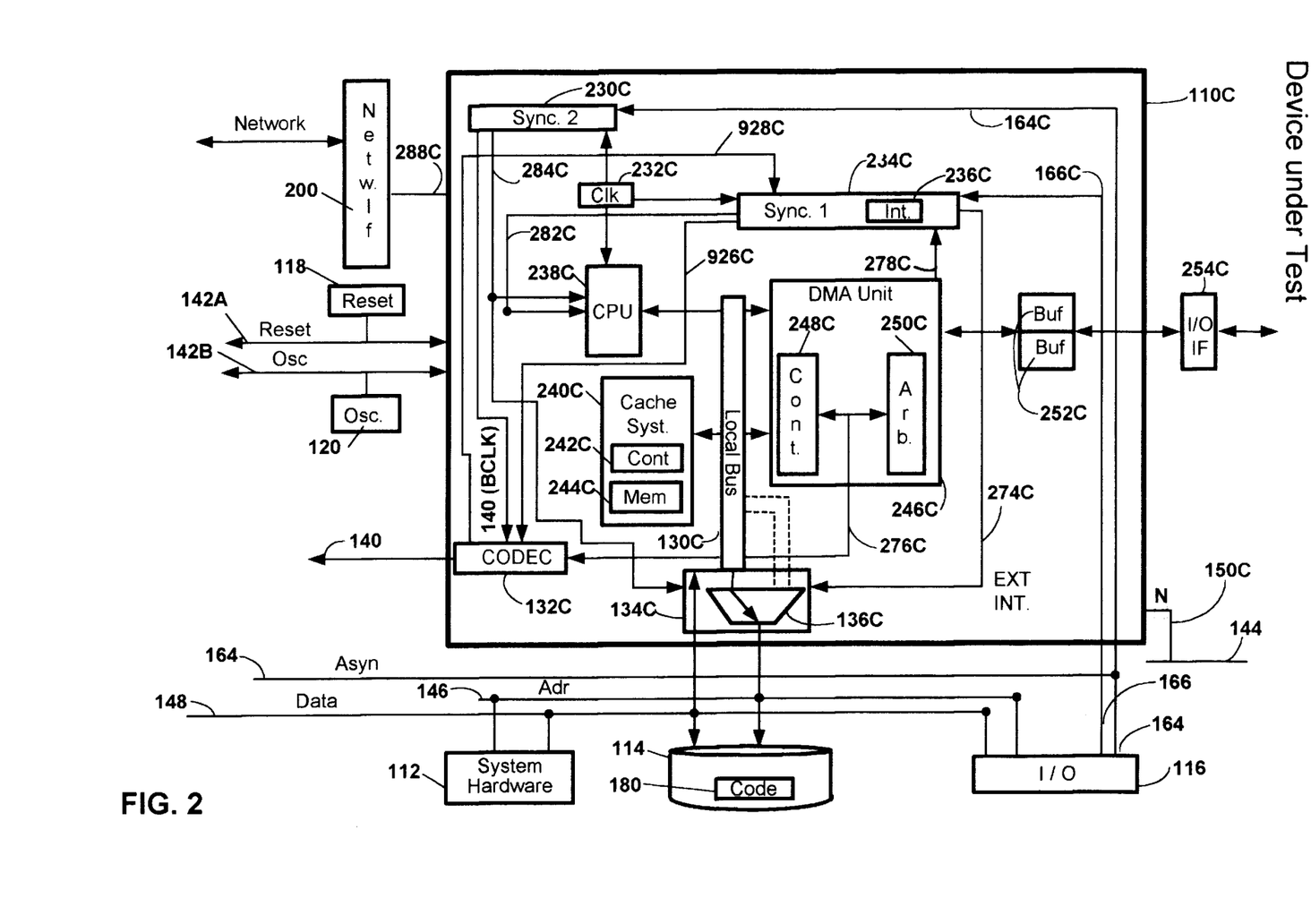
FIG. 2 is a detailed hardware block diagram of the chips shown in FIG. 1.

FIG. 2 shows a detailed block diagram of the representative one, i.e., chip 110C, of the debug chips 110A–C described above in connection with the embodiment of FIG. 1. The chip contains: clock 232C; CPU 238C; cache system 240C, including cache controller 242C and cache memory 244C; DMA unit 246C, including DMA controller 248C, DMA arbitrator 250C, and associated DMA I/O buffers 252C. Additionally, the chip includes the following debug components which allow it to perform in DUT mode or any of several MONITOR modes, as discussed above in connection with FIG. 1. These debug components are: the first synchronization circuit/unit 234C including interrupt unit 236C; the second synchronization circuit/unit 230C; the Codec 132C; and the debug switch 136C. The debug switch passes synchronous and asynchronous processing states across the address pins of the chip to the "outside world". Each of the debug components has a control connection coupling it to the mode input pin 150C. The configuration of each component varies responsive to a mode signal on the mode input pin 150C. The mode signal places each component in DUT mode or any of several MONITOR modes.

The chip itself is shown connected to a network interface 200 over bus 288C, to reset unit 118 over reset line 142A, to oscillator 120 over oscillator signal line 142B, to Codec 132C and to associated sister chips, e.g., 110A–B, over debug bus 140, to memory 114 and I/O unit 116 via address 146 and data 148 portions of the system bus, to the mode select bus 144 via mode input pin 150C, to peripheral DMA devices via DMA I/O interface 254C and finally to sister chips 110A–B via an asynchronous event bus 164. In an embodiment of the invention the network interface couples to the chip 110C through a network interface bus 288C, which bus for example is an MII bus of IEEE standards 802.3.

Internal to the chip, the CPU 238C and cache system 240C are coupled to the local bus 130C. The cache controller 242C may implement any one of a number of cache policies including write-through and copyback. In an embodiment of the invention, the chip provides an additional feature of a onboard DMA unit 246C with associated I/O buffers 252C which couples to an external DMA I/O interface 254C to provide access to and from a number of peripheral devices (now shown). Further details of this novel DMA unit 246C are set forth in co-pending application entitled Method And Computer System For Improved Memory Accessing By A DMA Unit, with inventors Jan Bengtson, Kenny Ranerup, Per Zander, filed on Oct. 9, 1998, as U.S. application Ser. No. 09/169,513, which application is incorporated by reference as if fully set forth herein.

The clock 232C couples to the CPU 238C as well as to the first and second synchronization units 234C, 230C. The first synchronization unit 234C accepts external interrupts on signal line 166C, and may accept input for reservation of time slots for DMA information on the debug bus 140 from the DMA unit 246C via signal line 278C. The first synchronization unit provides outputs over signal line 274C to the memory control unit 134C. The first synchronization unit additionally provides outputs over signal line 282C to the CPU 238C and over signal line 926C to the Codec 132C. The second synchronization unit 230C receives asynchronous inputs via signal line 164 from the I/O unit 116. The outputs of the second synchronization unit are coupled to the Codec and the CPU. The DMA unit 246C is coupled via DMA signal line 276C to the Codec 132C.

In operation the mode signal on mode input pin 150C determines whether the device will be operating in master/DUT mode or the MONITOR mode. In the MONITOR mode, the input to mode input pin 150C determines the state of debug switch 136C, the first and second synchronization units, 234C, 230C and the Codec 132C.

When the mode signal on mode input pin 150C is set in the master/DUT mode, the first and second synchronization units 234C, 230C accept asynchronous inputs, e.g. interrupts, and DMA accesses, and delay the processing of those inputs for a sufficient number of clock cycles to allow the synchronization of the monitor units, 110A–B. This synchronization may be performed in the manner shown in the following FIG. 8. In the DUT/Master mode the debug switch 136C is coupled to the local address bus in a manner which as is traditionally the case isolates from the system address bus that portion of the address activity of the local bus which pertains only to read or writes to cache memory 244C.

As discussed above, chips 110A–B are identical to chip 110C shown in FIG. 2. The only distinction being that the debug portions of these chips, i.e., Codec 132A–B, first and second synchronization units, 234A–B, 230C and debug switches 136A–B are configured to synchronize their activity with the debug chip 110C as well as to expose certain internal states of the corresponding chip that would not normally be exposed to the outside world. The first of these capabilities, i.e., that of synchronizing with the sister chip is provided by the first and second synchronization units and the Codec.

In the MONITOR mode in the embodiment shown, there are numerous different states internal to the chip 110A–B which can be exhibited on either of the address outputs 160A–B for processing by the logic analyzer 102 (see FIG. 1). These states include coupling a selected one of local data bus 300A–B or the local address bus 302A–B to the corresponding debug switch 136A–B. These outputs are made available on the corresponding address output of the chip, e.g., 160A/B (See FIG. 1) for processing by the logic analyzer. Thus, while the chip 110C configured in master/device under test mode operates in a DUT mode as a fully featured computational unit, its sister chips configured in the MONITOR mode expose internal states associated with the processes carried out on the chip in the DUT mode by running identical program code and responding to asynchronous events in a manner identical to that of the DUT mode debug chip 110C configured as a bus master.

In the current invention, the first chip is configured as a device under test and is a bus master in the sense that its address output controls which memory locations will be read from and written to and therefore which data and instructions will be on the data bus at any point in time. The sister chips configured to run in MONITOR mode shadow the end data access activity of the master mode chip and carry out identical processes thereto in synchronization therewith. Thus a single chip can be constructed suitable for testing and for production which contains a minimum of additional onboard real estate devoted the debugging functions and a pin-out which except for pins associated with the mode input pin 150A–C and debug bus 140 is similar to that of a conventional chip without any debug capability.

Figure 3:
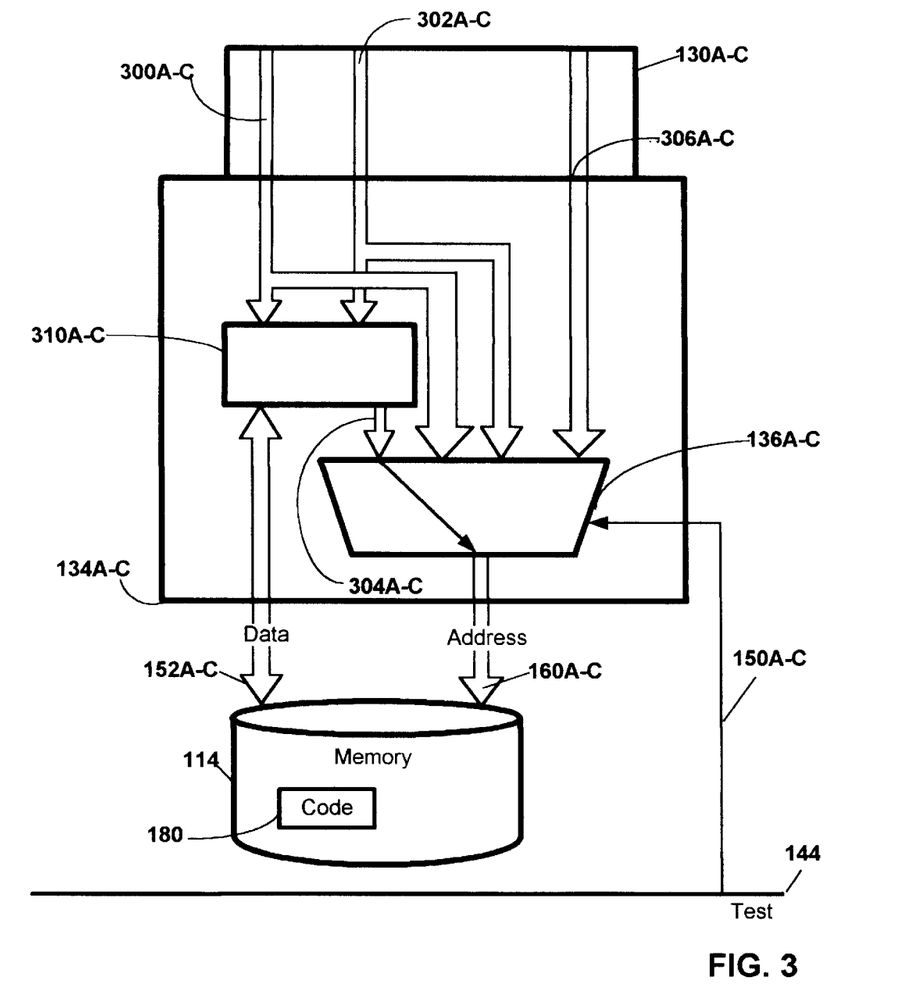
FIG. 3 is an expanded hardware block diagram of a local bus switch portion of the debug chips shown in FIGS. 1–2.

FIG. 3 shows a detailed embodiment of the memory control units 134A–C shown in FIG. 1. The memory control units each contain a memory interface units 310A–C and the debug switch 136A–C. Each of the memory interface units 310A–C is coupled over a control bus (not shown) to the corresponding ones of: the cache controllers 242A–C, the CPUs 238A–C and the DMA units 246A–C (see FIG. 2). On the local bus side, the control unit is coupled to the address bus portion 300A–C and the data bus portion 302A–C of the local bus. On the system bus side the control unit is coupled to the data lines 152A–C and to an intermediate system address bus 304A–C. The debug switches 136A–C are each coupled to a corresponding one of the mode input pins 150A–C. In the embodiment shown, the debug switch couples the address outputs 160A–C to either the local bus directly or indirectly via intermediate system address bus 304A–C from the memory interface units 310A–C. When coupled directly to the memory control unit the chip performs as a DUT computer with coupling between the address portion of the local bus and address output lines 160A–C determined by the cache policy implemented by cache controllers 242A–C and the contents, at any point in time, of cache memories 244A–C (See FIG. 2). The debug switch 136C may, alternately, be configured to MONITOR all activity on the local data bus 300A–C, the local address bus 302A–C or the signal lines. In another embodiment of the invention, other internal events, e.g. CPU or cache controller status, could also be monitored via internal event line 306A–C (See FIG. 3). These outputs are provided directly over the corresponding address output line 160A–C.

As will be obvious to those skilled in the art the apparatus disclosed herein exposes the internal states of a complex integrated circuit computational chip by inserting mode sensitive debug switching and synchronization capability into the chip. It is not necessary that the chip being enhanced with this debug capability have a local bus. Instead the debug switches need only have their inputs connected to internal signal lines and/or components on the chip which need to be monitored. The debug switch(es) output are connected to address lines of the chip. In an embodiment of the invention the synchronization circuitry can comprise something as simple as a common clock. This might be practical where for example no asychronous events were handled by the chip. In alternate embodiments of the invention in which asychronous events are handled by the chip the synchronization circuitry described and discussed in FIG. 9 would be appropriate. The synchronization circuitry is connected to asynchronous signal inputs on the chip and to a debug bus with a multiplexing capability to reduce pin count. Finally both the debug switches and the synchronization circuitry are responsive to a mode signal at a mode pin on the chip to configure themselves in a DUT state or one of several MONITOR states. Numerous types of chips and the program code intended for use thereon can be debugged using the above mentioned apparatus. Those chips include but are not limited to: digital signal processors, graphics processors, video processors, signal processors, pattern processors, programmable logic devices, field programmable devices, micro controllers . . . . . etc. By coupling several chips in monitor mode to a chip in DUT mode the MONITOR mode chips can mirror the processing taking place on the DUT mode chip while outputting on their address lines the internal processing states of the DUT mode chip. By setting each of the MONITOR mode chips in a different monitoring mode more than one internal state of the DUT mode chip can be concurrently obtained. By connecting the address lines of the MONITOR mode chips to a logic analyzer the internal states can be evaluated in detail.

Figure 4:
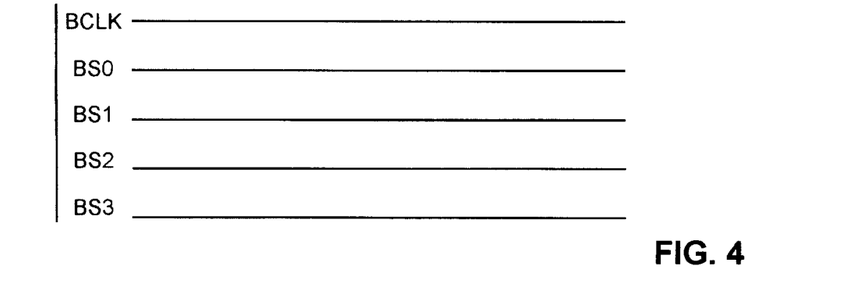
FIG. 4 shows the signal lines of the debug bus 140 shown in FIG. 1.

Referring now to FIG. 4, the debug bus 140 comprises only five paths, one of which BCLK is used by the second synchronization circuit 230C for transmitting synchronization information on external asynchronous signals, such as DMA request signals or wait signals from I/O units connected to the system bus 146–148 through a bus connected input/output (I/O) unit 116 (FIG. 1). External asynchronous signals are forwarded by the I/O unit 116 to the second synchronization circuit 230C and the monitor 100. External interrupt requests generated by the I/O unit 116 are forwarded to the first synchronization circuit 234C.

The other four paths BS0–BS3 are used for transmitting CPU and DMA status information from the DUT mode debug chip 110C to the monitor 100. Additionally, the debug bus paths BS0–BS3 are used for the above mentioned synchronization of the monitor 100 with the DUT mode debug chip 110C during system reset operations, where the relevant codes are originated from the first synchronization circuit 234C.

Digitally, thus, a total of 16 different four bit words, or codes, are available. The lower ten codes thereof, i.e. logically 0–9, are used for transmitting DMA status, corresponding to the ten DMA channels used in this embodiment. The information communicates which DMA channel to be admitted and, when a read is taking place, if necessary, how many bytes that are left to be received. This is required because of reception of data in blocks, in this case four byte blocks, and the time period required for the transmittal of the DMA status information to the monitor 100. Thus, when the data left to be received from the I/O unit are less than or equal to eight bytes and the I/O unit signals end of data, information thereof must be transmitted to the monitor 100. This status information is transmitted from the arbitrator 250C over the debug bus 140 to DMA controller 248B, as well as on a DMA signal line 276C to DMA controller 248C.

Codes 10–15 are used for the CPU interrupt status generated by the first synchronization circuit 234C, as follows:

10 IRQ with external vector number, no NMI;
11 IRQ with external vector number, and NMI;
12 No IRO, no NMI;
13 NMI, but no IRQ;
14 IRO with internal vector number, no NMI; and
15 IRQ with internal vector number, and NMI.

IRQ means Interrupt ReQuest, NMI means Non Maskable Interrupt. When the DMA unit 246C is about to use the debug bus 140, in order not to unbalance the interrupt handling in the DUT mode debug chip 110C in relation to the monitor 100, a signal is transmitted by the DMA unit 246C to the first synchronization circuit 234C. This signal causes the first synchronization circuit 234C to hold the interrupt status. Not until the debug bus 140 is released by the DMA unit 246C new interrupt status information is transmitted to the CPUs 238C, 238A–B of respectively the DUT mode debug chip 110C and the monitor 100.

The on board DMA unit 246C is synchronized in the buffers 252C of the DUT, and prioritized in arbiter 250C. The result of this synchronization and arbitration is then presented to the DMA control 248C, and via Codec 132C, debug bus 140 and Codec 132A–B, to DMA control units 248A–B. Thus, the control part of the operation of the on board DMA is mirrored in the Monitor mode chips 110A–B. The data portion of the on board DMA is handled by letting all DMA data go out over the external memory data bus. The data will then be available for the Monitor mode chips.

Since the present debug system 98–100 is constructed such as to provide the logic analyzer with complete data, address and asynchronous event information while the DUT mode debug chip 110C is running, in spite of the cache system 240C integrated on the chip, it is possible to improve the memory accessing by the memory control unit 134C as will be described below.

Figure 5:
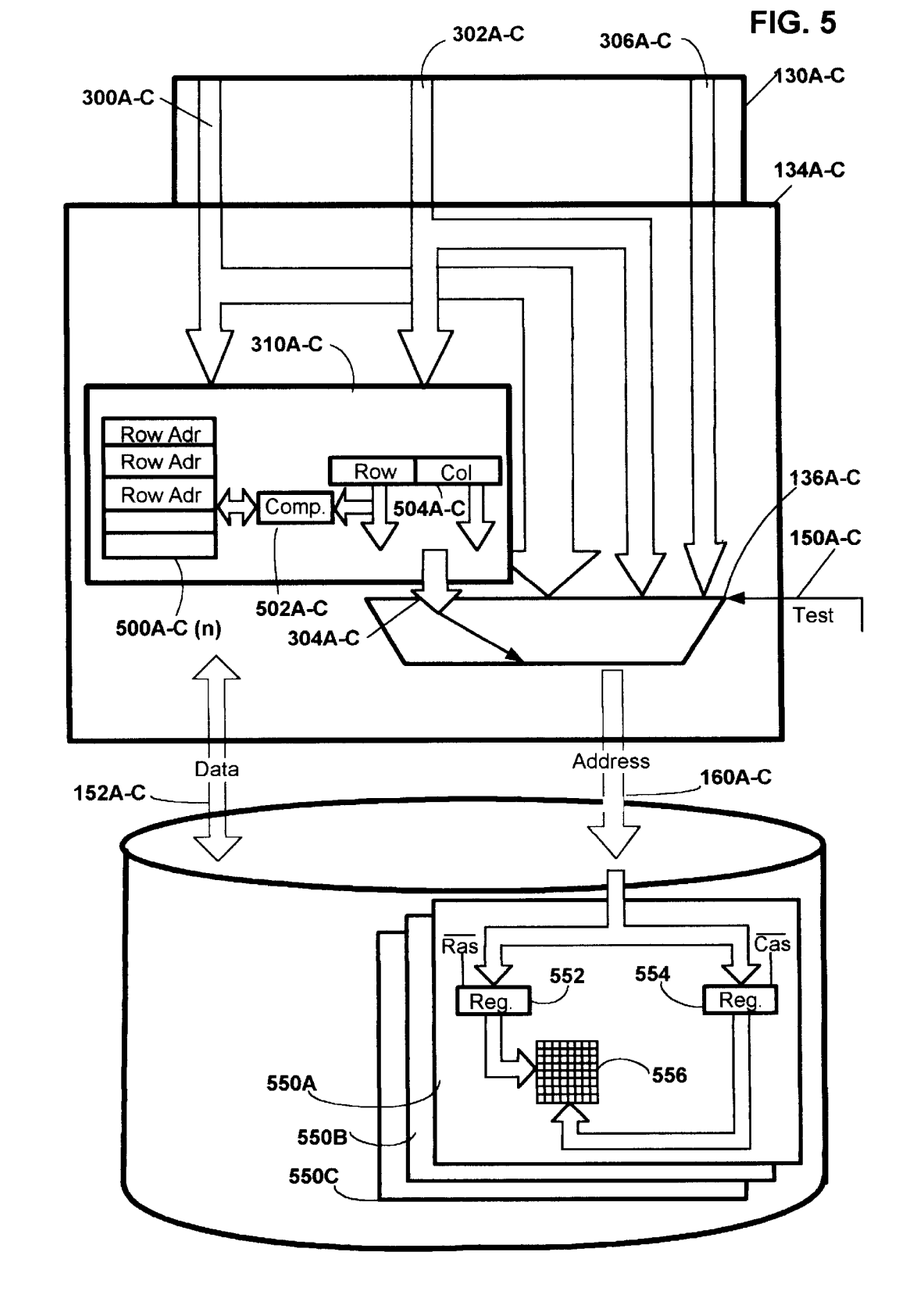
FIG. 5 is a detailed hardware block diagram of the interface between the memory control unit of the debug chips shown in FIGS. 1–2 and main memory.

FIG. 5 is a detailed hardware block diagram of the interface between the memory control unit of the enhanced debug chips shown in FIGS. 1–2 and main memory. In an embodiment of the invention main memory typically comprises several DRAM, i.e. dynamic random access memories. Each DRAM 550A–C has its memory area 556 arranged like a matrix, being addressed by a two-part address, where the lower part is a column address 554 and the upper part 552 is a row address. In the preferred embodiment, the memory control units 134A–C performs a further improved memory access, taking advantage of the fact that subsequent memory accesses often involve subsequent addresses. Hence, the memory control unit 134C is provided with a separate row address register 500A–C for each DRAM circuit 550A–C of the main memory 114, and a comparison unit 502A–C. An address buffer 504A–C of the memory control unit 134C holding the full main memory address is divided into two portions, each separately loadable into the main memory 114. While for subsequent main memory accesses the row address of the subsequent main memory address is the same as for the previous one, only the column address portion 504B needs to be loaded. This is time saving compared to each time loading the whole address, i.e. firstly the row address and secondly the column address. To determine if the row address is the same as the previous one, the comparison unit compares the row address portion 504A with the contents of the row address register of the DRAM presently operated on. If there is a match only the column address portion 504B is input; if not both the row address and the column address are input and, simultaneously, the register is updated. The two buffer portions 504A–B are multiplexed onto the system bus 146–148 by the debug switch 136A–C of the memory control unit 134A–C.

Figure 6:
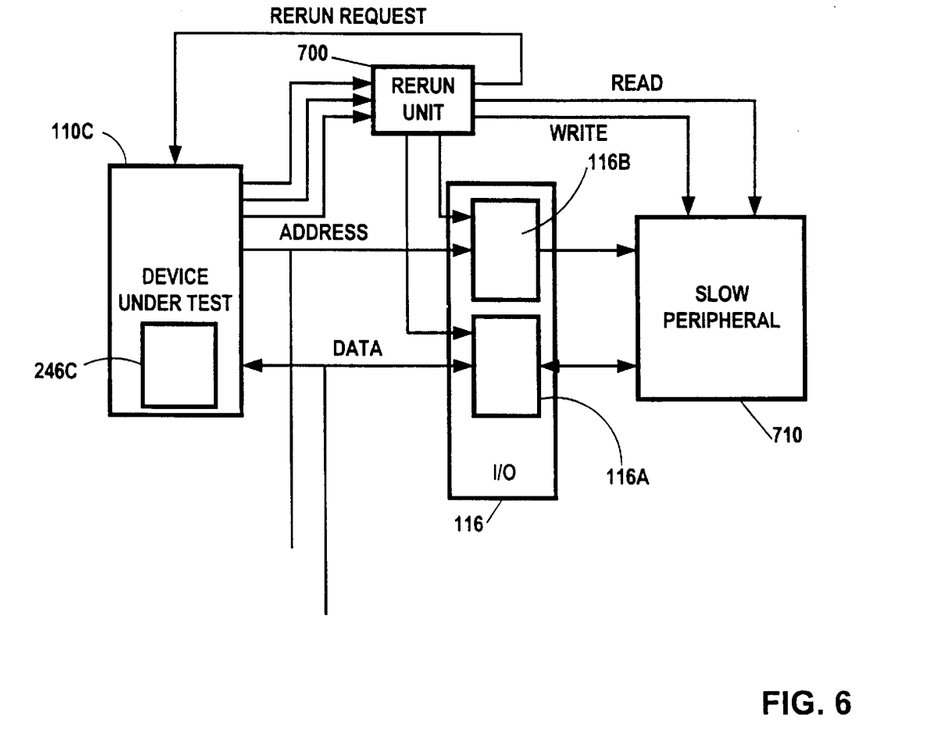
FIG. 6 is a schematic block diagram illustrating an interface between the debug chip shown in FIGS. 1–2 and slow peripheral device.

FIG. 6 is a schematic block diagram illustrating an interface between the enhanced debug chip shown in FIGS. 1–2 and slow peripheral device. External rerun unit 700 can be utilized for particularly for slow peripheral units 710, principally older ones. If data transmission times are too long, the system bus 146–148 is occupied an excessive time period, which may cause problems for another unit being dependent on time critical access. The rerun unit 700, below referred to as the rerun unit assists the CPU 238C in the read and write operations on such slow peripherals. Let us, for example assume that data are to be read from the peripheral unit 710.

From the beginning of a CPU access the rerun unit 700 buffers address information in an address buffer 116B and starts a rerun routine setting a time out and communicating a rerun request to the CPU 238C. This causes the CPU 238C to release the bus and continue with other tasks, which enables other bus masters within debug chip 110C, e.g. the DMA unit 246C to gain access. Meanwhile, the rerun unit 700 communicates with the peripheral. When the CPU 238C later on is trying to redo the read operation either the time out has lapsed or not. If it has lapsed, then the CPU 238C continues the read operation, and if not, then the rerun unit 700 puts another rerun request to the CPU 238C. When data are to be written to the peripheral unit 710 corresponding steps are performed, including buffering address and data in corresponding address and data buffers 116B–A. Data writing is continued by the rerun unit 700 while the system bus 146–148 is released for other tasks. Signals communicated from the CPU to the rerun unit 700 from the DUT mode debug chip 110C are chip select, read and write.

Due to the mirroring of the program execution onto the monitor 100 processing of interrupts is a problem that has to be handled in order to achieve an adequate synchronization and timing. This is particularly the case when several interrupts are at hand simultaneously.

Figure 7:
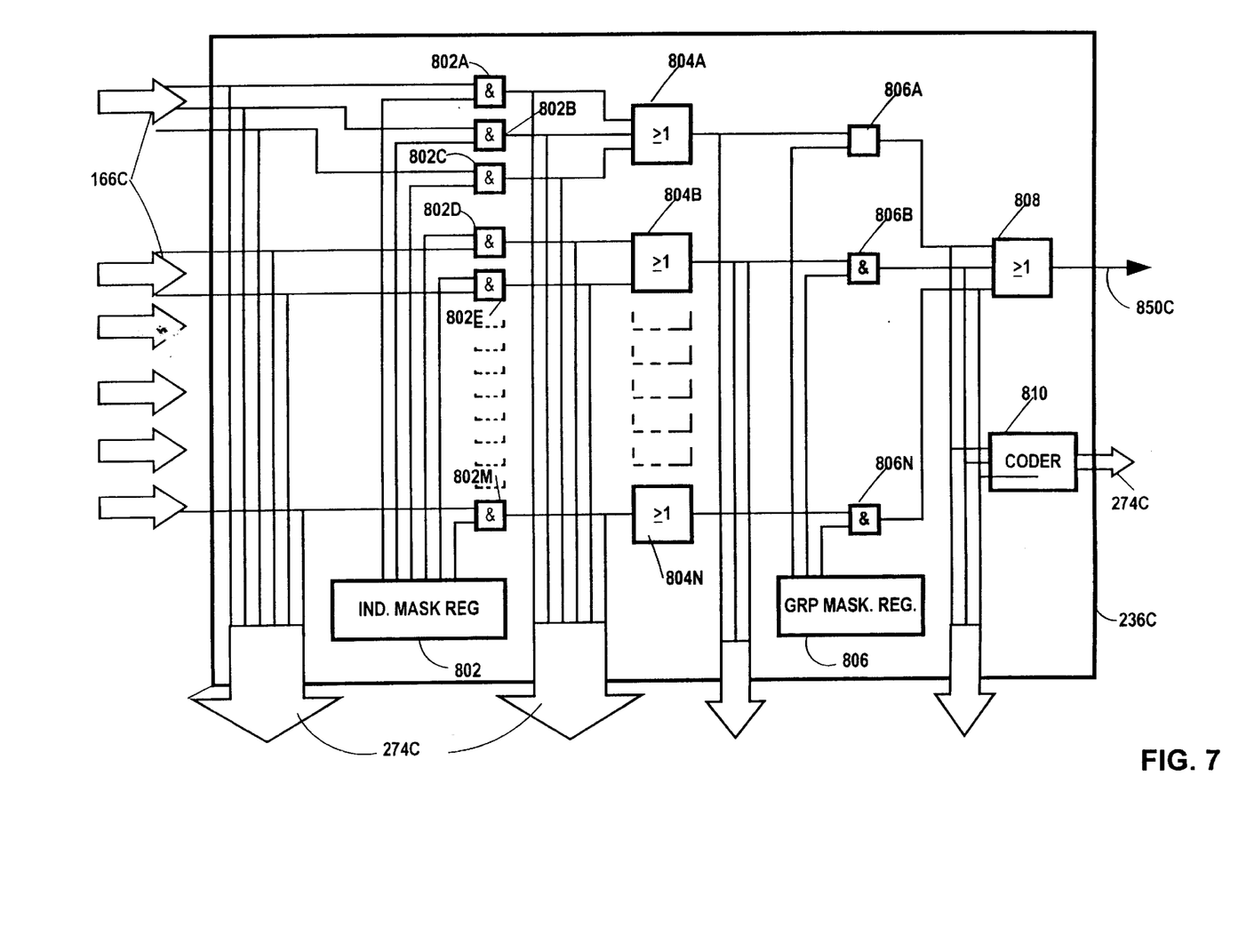
FIG. 7 is a schematic block diagram illustrating interrupt handling in the debug chip shown in FIGS. 1–2.

Hence, referring now to FIG. 7, according to another embodiment of the present invention dynamic priority handling is employed. FIG. 7 shows a representative unit corresponding to each of the interrupt units 236A–C (see FIG. 2). Only in the device in the DUT mode, i.e. chip 110C is the interrupt unit active. The interrupt unit accepts in the embodiment shown asynchronous inputs from the I/O unit 116 via signal lines 166C (see FIG. 2). These interrupts may be provided before interrupt masking or after interrupt masking and processing via signal line 274C to the external memory data bus by the DUT chip and is thus made available to the Monitor mode chip CPUs 238A–B when the DUT mode CPU 238C reads the interrupts. The prioritized output 850C of the interrupt unit 236C goes through the first synchronization unit 234C from which it is provided as an input to the Codec 132C (see FIG. 2). Each of the chips 110A–C contains an identical interrupt unit 236A–C but only in the DUT Mode chip 110C is the interrupt unit active.

Several individual interrupt request signals are received over interrupt lines 166C. These lines are connected to an individual interrupt mask schematically illustrated by a first mask register 802 and a first array of AND-gates. Thus, each of the individual interrupts is connected to an input of a respective AND-gate 802A–M of said first array and the mask register 802 is connected to the other input of each of the AND-gates 802A–M. Several interrupt signal lines 166C and the corresponding AND-gate outputs are connected to inputs of a respective OR-gate 804A–N. Thereby they are reduced to one signal for signal lines 166C. The outputs of the OR-gates 804A–N are maskable by means of a group mask illustrated by a second mask register 806 and a second array of AND-gates 806A–N, arranged similar to the individual mask and the accompanying AND-gates 802A–M.

The outputs of the second array of AND-gates 806A–N are connected to n inputs of an OR-gate 808. The output of the OR-gate 808 is connected through the synchronization circuit 234C to the CPU 238C of DUT mode debug chip 110C and to the Codec 132C where the status is encoded and sent to the monitor 100.

In order to be able to detect and separate the received interrupts and to be able to prioritize among them, readouts are admitted on different levels as desired. Preferably at least the outputs of the second array of AND-gates 804A–N are read and coded into a vector number by hardwired logic. The vector number differs for different combinations of interrupts. The vector number is outputted on the system bus 146–148. Thereby it is available for both the DUT mode debug chip 110C and the monitor 100. Thus, the vector number is generated by the DUT mode debug chip 110C but similarly used by both the DUT mode debug chip 110C and the monitor 100. The very interrupts are communicated through the first synchronization circuit 234C. The vector number is used by the CPU as an index number of a look-up table holding the interrupt vectors. Mostly there is a single device interrupt, i.e. from only one unit 260C, 264C, and then it is obvious what interrupt vector to fetch. In case of more than one simultaneous interrupt the vector number corresponds to a priority routine ordering the interrupts by priority. Then, the different interrupts are handled in that order.

Hence, there is a fast interrupt handling in most cases, when there is only one interrupt present and a more time consuming priority based handling only when there are interrupts from more than one unit. In order to determine exactly what interrupt is present from the unit to be handled there is, of course, a possibility to detect the signal lines either on the inputs or on the outputs of the individual mask 802A–N. Further, when an interrupt request reaches the CPU, it may be originated not only internally but also externally from an I/O device, and, additionally, there are non-maskable interrupts.

Figure 8:
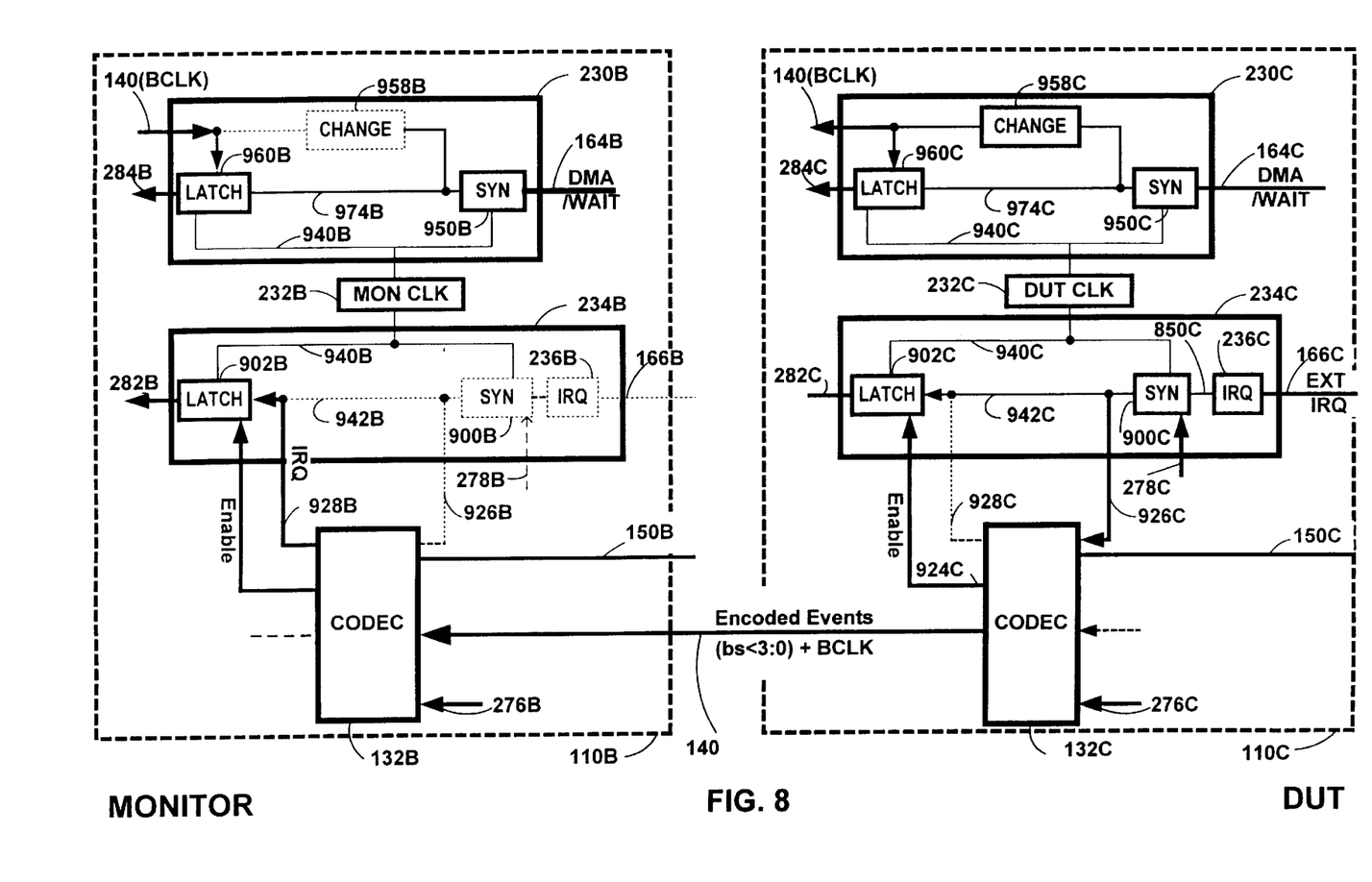
FIG. 8 show the synchronization units of the debug chips shown in FIG. 1.

FIG. 8 is a hardware block diagram showing details of the first and second synchronization units of the MONITOR mode chip 110B and the DUT mode debug chip 110C shown in FIG. 1. These units generally handle the synchronization of internal/external asynchronous events among the debug chip in the DUT mode and the debug chips in the MONITOR mode. As discussed above, each chip contains identical hardware which is configured in a manner dependent on the mode of the chip as established by an input signal on mode input pin 150B–C.

A partial block diagram of two debug chips 110B–C is shown. The first and second synchronization units of both chips are shown. The synchronization units of the first debug chip are in MONITOR mode corresponding to the state of the chip 110B as established by a mode signal on the mode input pin 150B of the chip. The synchronization units of the second debug chip are in DUT mode corresponding to the state of the chip 110C as established by a mode signal on the mode input pin 150C of the chip.

Structurally the synchronizers in both chips contain identical components but, as discussed above, the coupling between those components may change depending on the mode setting for the chip. For this reason each of the synchronizers will be discussed in both the DUT mode and MONITOR mode. Parts labeled with a "B" reference suffix are in chip 110B which is in the MONITOR mode. Parts labeled with a "C" reference suffix are in chip 110C which is in the DUT mode.

The second synchronization circuits 230B–C each contain latches 960B–C, change detect units 958B–C and synchronizers 950B–C. The first synchronization units 234B–C each contain latches 902B–C, synchronizers 900B–C and interrupt units 236B–C. Associated Codecs 132B–C and clocks 232B–C and the corresponding connections are shown.

Second Synchronization Units

The second synchronization units adopt one of two configuration responsive to a mode select signal on the mode input pin 150. In the first configuration, corresponding to the DUT mode, the second synchronization unit 230C detects an asynchronous signal on an asynchronous signal bus linking both the MONITOR mode and DUT mode chips 1110B–C. The second synchronization unit synchronizes the signal with the DUT clock 232, and latches it. The second synchronization unit then determines when there is an interval of "no change" following receipt of the asynchronous signal and after the onset of the "no change" interval outputs an enabling signal to the sister chip 110B and unlatches the signal releasing it to internal components of the chip for processing. In the second configuration, corresponding to the MONITOR mode, the second synchronization unit 230B detects an asynchronous signal on the asynchronous signal bus, synchronizes the signal with the MONITOR clock 232B, and latches it. The second synchronization unit then upon receipt of the enabling signal from the sister chip 110C unlatches the signal releasing it to internal components of the chip for processing. As will be obvious to those skilled in the art there are numerous methods and apparatus for synchronizing the latches including fixed delays, variable delays in the DUT mode and MONITOR mode, delays responsive to the receipt of the synchronization information, as well as a latch enable signal generated by the DUT mode chip and passed to the MONITOR mode chip.

The configuration of the second synchronizers units 230B–C is as follows. Both synchronizer units have input from the asynchronous bus 164 via respectively signal lines 164B–C (see FIG. 1) which couple to the synchronizers 950B–C of each unit. On this bus external asynchronous events such as external DMA accesses and wait states are received. On both synchronizer units the output of the synchronizers 950B–C is connected to a respective one of the inputs of the change units 958B–C and the latch units 960B–C over signal line 974B–C. In the DUT mode debug chip the output of the change unit 958C is coupled to the enable input of latch 960C and to the BCLK line of the debug bus 140. In the MONITOR mode debug chip 110B the change detect unit 958B is inoperative and the latch 960B receives it's enabling input via the BCLK line instead.

In operation the activity of the second synchronization units 230B–C is coordinated by the change detect unit 958C in the DUT mode. Both units 230B–C receive an asynchronous DMA or wait state signal on asynchronous bus 164 over respectively signal lines 164B–C. The signal is synchronized to the clock 232B–C of each chip by the corresponding synchronizers 950B–C. In an embodiment of the current invention these synchronizers consist of one or more flip-flops. When the change detect unit 958C of the DUT mode debug chip 110C detects a period of change followed by inactivity it outputs an enabling signal to the enable input of the latches 960B–C of the second synchronization units of both chips. The signal to latch 960B arrives via the BCLK line of debug bus 140. The synchronization is thus achieved by triggering latch units 960B–C with a common signal generated by the change unit 958C. The outputs 284B–C of respectively latches 960B–C are provided to the CPUs 238B1–C and memory control units 134B–C of their respective chips 110B–C. The synchronization of chips during power on and wait states is handled by the second synchronization units of both the DUT mode and MONITOR mode chips via their connection to the asynchronous bus 164 over which bus power on reset and wait states are introduced passed to the chips. Note that the synchronization apparatus discussed above does not synchronize the clocks 232B–C of the first and second chip, these may in fact be skewed with respect to each other. Instead the synchronizers delay the execution of external asynchronous signals and enable their processing on identical clock cycles in all chips, even though those identical clock cycles may be skewed.

First Synchronization Units

The first synchronization units adopt one of two configurations responsive to a mode select signal on the mode input pin 150. In the first configuration, corresponding to the DUT mode, the first synchronization unit 234C detects one or more asynchronous signals, synchronizes them with the DUT clock 234C, prioritizes them in the interrupt register, latches them, and forwards synchronization information about the asynchronous signal through Codec 132C to the Codec of its sister chip 110B, and after an appropriate delay releases the latched signal(s) to internal components of the chip for processing. In the second configuration, corresponding to the MONITOR mode, the first synchronization unit receives the synchronization information from its Codec 132B and latches that information and after an appropriate delay releases the latched signal(s) synchronously with the first latch to internal components of the chip for processing. As will be obvious to those skilled in the art there are numerous methods and apparatus for synchronizing the latches including fixed delays, variable delays in the DUT mode and MONITOR mode, delays responsive to the receipt of the synchronization information, as well as a latch enable signal generated by the DUT mode chip and passed to the MONITOR mode chip.

The configuration of the first synchronizer units 234B–C is as follows. The synchronizer unit 234C accepts input from the external Interrupt line 166 of the I/O unit 116 via signal lines 166C (see FIG. 1) which couple to the interrupt unit 236C. The interrupts are prioritized in interrupt unit 236C and synchronized in unit 900C. then via the DUT mode Codec 132C the synchronization information is sent via bus 140 to the monitor mode chips 110A–B. The output of the synchronizers is coupled to the latches 902B–C via signal lines 942B–C and to the Codecs 132B–C via signal lines 926B–C.

In the DUT mode debug chip 110C the input to latch 902C is provided by synchronizer 900C from interrupt unit 236C. In the MONITOR mode debug chip 110B, by contrast, the synchronizer 900B and interrupt unit 236B are disabled. The latch 902B receives its input from Codec 132B via signal line 928B. This signal is itself derived from the encoded interrupt information passed from Codec 110C to Codec 110B via the debug bus 140. Codec 110C derives that information from the first synchronization unit 234C via signal line 926C. In an embodiment of the invention, the DMA unit 246C can reserve time slots for DMA information on the debug bus 140 via signal line 278C. When the synchronization unit 900C receives a reservation signal on line 278C, it holds the current interrupt status on line 942C until the DMA unit 246C releases its reservation signal. In the MONITOR mode chip, the Codec 132B holds its current interrupt status output signal 928B as long as it receives DMA related encoded events on the debug bus 140. Thus, the changes on the interrupt signals 282B and 282C will be synchronized to the same clock cycle. Latches 902B–C output the synchronized interrupt signal on signal lines 282B–C to the corresponding one of: the CPUs 238B1–C of the MONITOR mode debug chip 110B and the DUT mode debug chip 110C. Thus, the output signals are identical in content and timing allowing synchronous handling of interrupts on both chips.

Thus, the first and second synchronization units 234B–C, 230B–C share similar functional features. In the DUT mode, either of the synchronization units detect and synchronize asynchronous events with the DUT clock. The presentment of that synchronized asynchronous event to the CPUs 238, DMA units 136, and memory control units 134 of each chip is governed by the DUT mode chip. The change unit 958C of the DUT mode chip governs when the latches 960B–C of the second synchronizers will be enabled. The first synchronization units 234B–C of respectively the MONITOR mode and DUT mode chips 110B–C share similar operating features with that of the second synchronization units 230B–C, e.g. the synchronization and latch features.

As will be obvious to those skilled in the art the synchronization and latch features can be implemented using a variety of electrical circuits including but not limited to: store and forward circuits and sample and hold circuits.

The first and second synchronization units in the DUT mode device operate independently in parallel. The reservation of time slots for DMA information on the debug bus 140 is handled entirely within the first synchronization unit.

Encoded Event Bus

On the encoded event debug bus 140 all signals are coded and multiplexed. The coding and multiplexing is performed by Codec 132C which is in the DUT mode. The decoding and demultiplexing is performed by Codecs 132A–B which are in the MONITOR mode. The debugging system operates as follows. The DUT mode debug chip 110C as well as the MONITOR mode chips 110A–B are reset by a RESET signal activated when the power is turned on. In an embodiment of the invention, when RESET is activated the MONITOR mode chip 110A–B generates an enable signal on the debug bus 140 to tell the DUT mode debug chip 110C to enable the debug bus 140C of its Codec. Meanwhile, the second synchronization unit 230C of the DUT mode debug chip 110C synchronizes the reset signal RESET. This later function may alternately be accomplished in a dedicated synchronization unit, not shown. Then, when RESET is inactivated the monitor 100 turns off the enable signal. Subsequently, the DUT mode debug chip 110C transmits the synchronized reset signal to the monitor 100, which in turn synchronizes its internal clocks with the DUT mode debug chip 110C clocks. In an embodiment of the invention, the internal clock may be generated by multiplying a base frequency of 20 MHz by means of a clock multiplying means, not explicitly shown, up to 200 MHz. The multiplying means may comprise a PLL circuit.

Logic Analyzer

The information extracted by the logic analyzer 102 from the MONITOR mode chips 110A–B, e.g. local bus data, local bus address as well as asynchronous events, DMA accesses and interrupts is to be displayed in an easily readable way on for example computer 104 (see FIG. 1). In an embodiment of the invention the logic analyzer may include a network connection which allows it to be remotely monitored over a network. Additionally it is possible to use the workstation as a web server to provide information or a web browser for display on the network 106. Further, this arrangement permits the use of the general purpose computer 104 for controlling the whole debugging process over the network. Hence, it is used for applying different stimuli to the DUT mode debug chip 110C for testing different portions of the program that is being debugged. This preferred solution of the analyzing system provides the advantage of admitting a relatively simple and cheap logic analyzer, in comparison to an ordinary logic analyzer, since the major part of the data processing is transferred from the logic analyzer 102 to the computer 104. By using appropriate general software for data processing and appropriate general software for displaying results it is possible to achieve an easy and efficient employment of the general purpose computer for the debugging operation.

While the invention has been particularly shown and described with reference to a preferred embodiment thereof, it will be understood by those skilled in the art that various changes in form and detail may be made therein without departing from the spirit and scope of the invention. In the following some examples thereof will be discussed.

Instead of incorporating the memory unit on the circuit board it would be possible to have no memory unit on the very circuit board but rather use an externally connectable memory unit, or even to have no memory except for the cache memory on the chip.

Another example of modifications is to provide just one or more than two chips in the monitor mode, depending on what different outputs are desired to the analyzing equipment.

Further, in addition to address and data signals further signals could be output to the logic analyzer, such as CPU status signals or internal states of the CPU, the DMA unit etc.

In yet another embodiment the DMA unit could be implemented externally to the chip rather than being integrated thereon.

What is claimed is:

1. An integrated circuit chip having internal components coupled to one another to execute processes on the chip and a plurality of address and data connections for interfacing with the chip, and the integrated circuit chip comprising:

a debug switch switchably coupling selected ones of the internal components to the address connections in response to a mode signal; and at least one synchronization unit switchably configurable in response to the mode signal between a device under test (DUT) configuration and a Monitor configuration and in a DUT configuration to latch an asynchronous signal from an external asynchronous signal source, to output an enabling signal, and to unlatch the asynchronous signal releasing it to at least one of the internal components for processing; and in a MONITOR configuration to latch the asynchronous signal from the asynchronous signal source and responsive to the enabling signal to unlatch the asynchronous signal releasing it to at least one of the internal components for processing.

2. The integrated circuit chip in accordance with claim 1, wherein the at least one synchronization unit in the DUT configuration outputs the enabling signal during a period of no signal change.

3. The integrated circuit chip in accordance with claim 1, wherein the asynchronous signal comprises at least one of a direct memory access (DMA) request and an interrupt.

4. An integrated circuit chip having internal components coupled to one another to execute processes on the chip and a plurality of address and data connections for interfacing with the chip, and the integrated circuit chip comprising:

a debug switch switchably coupling selected ones of the internal components to the address connections in response to a mode signal; and at least one synchronization unit switchably configurable in response to the mode signal between a device under test (DUT) configuration and a Monitor configuration and in a DUT configuration to latch an asynchronous signal from an external asynchronous signal source, to output an encoded signal corresponding with the asynchronous signal, and to unlatch the asynchronous signal releasing it to at least one of the internal components for processing; and in a MONITOR configuration to decode the encoded signal, to output and latch a decoded signal corresponding thereto, and after a delay to unlatch the decoded signal to at least one of the internal components for processing.

5. The integrated circuit chip of claim 4, wherein the at least one synchronization circuit further comprises:

a codec responsive to a first mode select signal to adopt the DUT configuration in which to generate the encoded signal with codes corresponding with the asynchronous signal and synchronization information related thereto and the codec further responsive to a second mode select signal to adopt the MONITOR configuration in which to decode the encoded signal and after the delay to unlatch the decoded signal to the at least one of the internal components for processing.

6. The integrated circuit chip of claim 4, wherein the asynchronous signal comprises at least one of an interrupt and a direct memory access (DMA) request.

7. A debug circuit for incorporation into an integrated circuit chip having internal components coupled to one another to execute processes on the chip and address pins, data pins, and a clock pin for interfacing with the chip, and the debug circuit comprising:

a debug switch with inputs, an output and a control connection, and the inputs coupled to selected ones of the internal components, the output connected to the address pins and the control connection coupled to a mode select pin for interfacing with the chip, and the debug switch responsive to a mode signal on the mode select pin to couple one of the inputs to the output to provide for monitoring the processes on the chip at the address pins; and a synchronization circuit with an input, an output, and a control connection, and the control connection coupled to the mode select pin, the input configured to couple to an asynchronous signal source, and the output coupled to at least one of the internal components, and the synchronization circuit responsive to a first mode select signal at the mode select pin to adopt a device under test (DUT) configuration in which to latch an asynchronous signal from the asynchronous signal source, to output an enabling signal during a period of no signal change on the input, and to unlatch the asynchronous signal releasing it to the internal components of the chip for processing.

8. The debug circuit of claim 7, with the synchronization circuit further responsive to a second mode select signal to adopt a MONITOR configuration in which to latch the asynchronous signal from the signal source and responsive to the enabling signal to unlatch the asynchronous signal releasing it to the internal components of the chip for processing.

9. A debug circuit for incorporation into an integrated circuit chip having internal components coupled to one another to execute processes on the chip and address pins, data pins, and a clock pin for interfacing with the chip, and the debug circuit comprising:

a debug switch with inputs, an output and a control connection, and the inputs coupled to selected ones of the internal components, the output connected to the address pins and the control connection coupled to a mode select pin for interfacing with the chip, and the debug switch responsive to a mode signal on the mode select pin to couple one of the inputs to the output to provide for monitoring the processes on the chip at the address pins; and a synchronization circuit with an input, an output, and a control connection, and the control connection coupled to the mode select pin, the input configured to couple in a device under test configuration (DUT) to an asynchronous signal source, and the output coupled to at least one of the internal components, and the synchronization circuit responsive to a first mode select signal at the mode select pin to adopt the DUT configuration in which to latch an asynchronous signal from the signal source, and to output an encoded signal corresponding to the asynchronous signal and to unlatch the asynchronous signal releasing it to the internal components of the chip for processing.

10. The debug circuit of claim 9 with the synchronization circuit further responsive to a second mode select signal to adopt a monitor configuration in which to receive the encoded signal, to decode the encoded signal, to latch the decoded signal and after a delay to unlatch the decoded signal releasing it to the internal components of the chip for processing.

* * * * *